United States Patent [19] [11] 4,320,022
Aitcin [45] Mar. 16, 1982

[54] DRY GRANULAR CALCINED MAGNETIC FRACTION OBTAINED FROM CHRYSOTILE ASBESTOS TAILINGS

[75] Inventor: Pierre C. Aitcin, Sherbrooke, Canada

[73] Assignee: Societe Nationale de l'Amionte, Quebec, Canada

[21] Appl. No.: 127,547

[22] Filed: Mar. 6, 1980

[51] Int. Cl.$^3$ .................... C04B 35/04; C04B 35/14
[52] U.S. Cl. ................................ 252/62.59; 501/112; 252/62.64
[58] Field of Search ............ 106/60; 252/62.59, 62.64; 209/214

[56] References Cited

U.S. PATENT DOCUMENTS

| | | | |
|---|---|---|---|
| 2,691,443 | 10/1954 | Schoenlaub | 106/60 |
| 3,178,298 | 4/1965 | Craig | 106/60 |
| 3,193,503 | 7/1965 | Smith | 252/62.59 |
| 3,446,668 | 5/1969 | Arrance et al. | 106/60 |
| 3,785,842 | 1/1974 | Murray | 106/60 |
| 3,959,001 | 5/1976 | Clasen | 106/60 |

FOREIGN PATENT DOCUMENTS 1262465  2/1972 United Kingdom .

Primary Examiner—Earl C. Thomas
Assistant Examiner—Mark Bell
Attorney, Agent, or Firm—Cushman, Darby & Cushman

[57] ABSTRACT

There is disclosed a dry granular calcined magnetic fraction obtained from chrysotile asbestos tailings comprising as its main constituents from 25 to 43% MgO, from 25 to 43% $SiO_2$, from 15 to 40% iron expressed as $Fe_2O_3$, and an $MgO/SiO_2$ ratio of from 0.8:1 to 1.3:1, said granular material passing a 4 mesh sieve. The novel product is useful for the preparation of heat storage cores and refractory bricks for glass tank checkers or blast furnace stoves.

2 Claims, No Drawings

DRY GRANULAR CALCINED MAGNETIC FRACTION OBTAINED FROM CHRYSOTILE ASBESTOS TAILINGS

BACKGROUND OF THE INVENTION

At the present time, countries which are subjected to substantially low temperatures during the fall, winter and spring seasons rely mainly on oil, coal or electricity as a means for heating. At the present moment, the dependence on oil for heating furnaces or for generating electricity is creating a problem due to the dependence on industrial countries on major oil producing countries.

The use of electricity as a means for heating creates a problem since electricity cannot be stored and therefore must be produced according to its demands by the consumers. Accordingly, daytime will produce peak demands while nightime will require low demands. In some countries, electricity-producing companies charge a lower rate for electricity consumed at night than for electricity consumed during the daytime or the peak period. Accordingly, in order to take advantage of the availability of electricity at a lower rate during the low peak period heat storage accumulators have been developped. These heat storage accumulators accumulate heat during the night and surrender the accumulated heat during the daytime, thus, decreasing the demand for electricity during the peak hours. It will be readily appreciated that if a larger demand for electricity can be generated during the low demand period, the efficiency of the power plants would be greatly improved.

Presently, most of available heat storage cores are made from olivine. Such cores are known to have high refractoriness properties, good heat storage capacity, good heat conductivity for refractory material, and chemical stability. As an example of a presently available heat storage core, there may be mentioned the product manufactured and sold by A/S Olivin, Aeheim, Norway, under the trademark MAGNOSIL 100. This heat storage core is made from olivine and contains 51% MgO, 40% $SiO_2$ and 6% $Fe_2O_3$.

Though this type of heat storage core presents definite advantages, it would appear that in this period of conservation of energy any improvement in heat storage cores which could increase the efficient use of electricity would make a valuable contribution to the energy problem.

Since the energy absorbed by a heat storage core is in function of its specific heat per unit of volume, the size of the core will thus become a factor which presents certain drawbacks, since such cores must be provided with an insulated cover in order to keep the accumulated heat before it will be withdrawn later for circulation in the areas to be heated when the need will appear. Accordingly, cores made from a material having a too low specific heat per unit of volume have to be relatively large in size in order to store a feasible amount of heat, with a corresponding increase in cost of insulating such cores.

On the other hand, it is known that the chemical composition of calcined chrysotile asbestos tailings is very close in many regards to that of olivine used to manufacture heat storage cores. For example, both contain magnesium oxide, silicon oxide and iron oxide. It is also known that chrysotile asbestos tailings constitute about 95% of all asbestos mined and since there is no practical commercial uses known for these asbestos tailings, the accumulation thereof constitutes and environmental and ecological problem for the populations residing close to asbestos mines.

The following Table I gives an idea of the relative similarity between olivine and chrysotile asbestos tailings.

TABLE I

|  | Olivine | Calcined chrysotile asbestos tailings | | |
|---|---|---|---|---|
|  |  | Sample A | Sample B | Sample C |
| MgO% | 49.0 | 48.3 | 46.3 | 48.7 |
| $SiO_2$% | 42.0 | 38.5 | 41.8 | 40.0 |
| $Fe_2O_3$% | 6.5 | 12.0 | 11.3 | 10.8 |
| $Al_2O_3$ | 0.7 | 0.7 | 0.4 | 0.4 |
| CaO | — | 0.1 | 0.1 | 0.1 |
| Alcalis | — | 0.05 | 0.06 | 0.06 |
| Loss on ignition | 1.2 | — | — | — |

Accordingly, it would appear to be highly desirable to provide modified chrysotile asbestos tailings which would approximate certain of the advantages of olivine in the manufacture of heat storage cores while possessing superior heat storage capacity and thermal conductivity per unit of volume.

SUMMARY OF THE INVENTION

In accordance with the present invention, it has now been found that a novel granular material can be derived from chrysotile asbestos tailings which can be advantageously used in the manufacture of heat storage cores possessing superior heat storage capacity and thermal conductivity per unit of volume than cores made from olivine. The granular material of the present invention can also be used for manufacturing refractory bricks for glass tank checkers or blast furnace stoves.

It is also a further aspect of the present invention to provide heat storage cores manufactured from the novel granular material of the present invention derived from chrysotile asbestos tailings.

Also, in accordance with the present invention, it has been found that the magnetic fraction of chrysotile asbestos tailings will, upon calcination, yield a granular material possessing an iron oxide content of from 15 to 40% by weight which is particularly suitable for the manufacture of heat storage cores possessing unexpectedly superior heat storage properties per unit of volume.

The present invention is predicted on the increase of iron oxide in the granular material obtained by the magnetic concentration of chrysotile asbestos tailings whereby the iron oxide content is unexpectedly increased from about 10% to from 13 to 35%. It will also be appreciated that the magnetic fraction obtained in accordance with the present invention will yield a material intermediate between the highly desirable refractory properties of olivine and the desirable high heat storage capacity of fritted iron oxide.

DETAILED DESCRIPTION

ASBESTOS TAILINGS

The chrysotile asbestos tailings used in accordance with the present invention are those passing a −4 Mesh sieve. It is known that the mesh size of asbestos tailings is conditioned by the in-plant treatment of the asbestos rock to extract the asbestos fibers due the geological history of the asbestos deposit.

MAGNETIC CONCENTRATION

The magnetic concentration step is carried out under dry conditions i.e. the tailings are caused to pass over a magnet whereby a magnetic fraction is retained and recovered for processing in accordance with the present invention. As an example of a suitable magnetic concentrator there may be mentioned one magnetic drum separator marketed under the trademark MORTSELL. The percentage of the treated asbestos tailings retained by the magnet will vary with the size of the tailings, the particular components of each mine and the magnetic intensity. Generally speaking, the percentage of tailings obtained in the magnetic concentration step will vary from about 20 to about 35% by weight of the initial tailings. It should also be appreciated that the iron is present in the tailings as $Fe_3O_4$ and as used herein is expressed in terms of $Fe_2O_3$.

CALCINATION

Once the magnetic fraction has been isolated from the starting asbestos tailings, it is submitted to calcination in a kiln at a temperature of from about 1250° C. to about 1400° C., thereby producing a dehydrated granular material. The calcination step serves to eliminate the water of crystallization so that when the calcined magnetized fraction is subjected to firing there will be no appreciable loss of weight and a very low shrinkage.

Chemically, the calcined magnetized fraction obtained from chrysotile asbestos tailings constitutes a novel material not found in nature. Its main constituents comprise 25 to 43% MgO, 25 to 43% $SiO_2$, 15 to 40% iron expressed as $Fe_2O_3$, the remaining elements being CaO, less than 1%, $Al_2O_3$ less than 1%, chromium and nickel oxides less than 0.5%, and alkalis less than 0.05%. Also the particle size of the product of the present invention is passing a −4 Mesh sieve. A further characteristic of the novel calcined magnetic fraction obtained from asbestos tailings in accordance with the present invention is that it can be fired to make bricks at temperatures within the range of from 1350° to 1500° C.

HEAT STORAGE CORE AND BRICKS

In order to obtain bricks from the calcined demagnetized fraction obtained from chrysotile asbestos tailings in accordance with the present invention, the latter is compressed in a mold and sintered at a temperature within the range of from 1350° to 1500° C. The sintering temperature should preferably be as high as possible in order to increase the density of the core. It should be appreciated that the liquefaction temperature of any mixture is in relation to its basicity index ($MgO/SiO_2$), the lower the index, the better sintering is obtained but at the expense of the refractoriness. A preferred range of basicity index that can be obtained with the present invention is from about 0.8 to about 1.3.

If desired, the basicity index of any composition of the present invention can be increased by adding thereto before sintering magnesium oxide in an amount of up to 25%. The modified composition can then only be sintered to a temperature of up to 1680° C. By proceeding in this manner, there is obtained a secondary ferromagnesian spinel having a melting point of about 1750° C., thus converting the composition of the present invention to a more refractory material.

It should also be appreciated that there is a practical limit to be desired in the degree of refractoriness. There is no need to obtain more refractoriness than is needed. The essential thing is to strive to obtain the best calorific capacity.

For example heat storage cores prepared in accordance with the present invention have surprisingly been found to accumulate more heat per unit of volume than heat storage cores prepared from olivine. It has been found that cores made from the magnetic calcined asbestos tailings of the present invention will store 10 to 15% more heat per unit volume than cores made from olivine, thus representing a substantial saving in energy used during the firing of the core to obtain the same heat storage capacity in an energy conscious period. By forming heat storage cores with the granular material of the present invention, it will be seen that cores having a size smaller than presently available cores made from olivine can be provided with the same efficiency, or cores having the same size as core made from olivine will store to 10 to 15% more heat.

The present invention will be more readily understood by referring to the following Examples which are given only to illustrate the invention rather than limit its scope.

EXAMPLE I 100 pounds of a residue from a chrysotile asbestos mine located in the Eastern Townships in the Province of Quebec passing a −35 Mesh sieve was subjected to a dry magnetic separation using a MORTSELL apparatus. The magnetic fraction represented 29.5 lb while the balance 70.5 lb constituted the non-magnetic fraction. The total iron content of the starting residue was 6.4% equivalent to 8.4% when calculated as $Fe_2O_3$ while in the magnetic fraction the iron content has been increased to 17.1% equivalent to 24.4% when calculated as $Fe_2O_3$.

The magnetic fraction was calcinated in a kiln at a temperature of 1250° C. for a period of 6 hours and the iron oxide content increased up to 27.8%. After calcination, a granular material weighing 25.9 lb was obtained.

This granular material was shaped in suitable molds and pressed to 5000 psi and fired up to 1500° C. After firing, the absorption of the refractory material was 0.8%, its specific gravity 3.05 and its cold crushing strength 22,800 psi. The specific capacity at room temperature was 0.18 BTU/lb/°F. (0.51 cal/cm$^3$/°C.). An X-Ray diagram and an examination under polarized light showed that this refractory material was essentially composed of olivine and magnesioferrite and contained also some small amounts of enstatite and hematite.

Table II provides a comparison of the various constituents through the various stages of operation.

TABLE II

|  | Initial residue −35 mesh % | Magnetic fraction % | calcined magnetic fraction (granular) % |
|---|---|---|---|
| MgO | 41.4 | 33.5 | 38.2 |
| $SiO_2$ | 34.0 | 27.8 | 31.7 |
| $Fe_2O_3$ | 9.2 | 24.4 | 27.8 |
| LOI* | 15.0 | 12.3 | — |
| $MgO/SiO_2$ | 1.22 | 1.21 | 1.21 |

*Loss on ignition

EXAMPLE II 100 pounds of a residue from a chrysotile asbestos mines in the Eastern Townships in the Province of Quebec passing a −28 mesh sieve was subjected to a dry magnetic separation using a MORTSELL apparatus. The magnetic fraction represented 31 lb while the balance 69 lb constituted the non-magnetic fraction. The total iron content of the starting residue was 7.3% equivalent to 10.4% when calculated as $Fe_2O_3$ while in the magnetic fraction the iron content has been increased to 19.3% equivalent to 27.6% when calculated as $Fe_2O_3$.

After calcination in a kiln at 1250° C. for a period of 6 hours, the iron oxide content increased to 30.9%, there was obtained a granular material weighing 27.7 lb.

This granular material was shaped in a suitable mold and pressed to 5000 psi and fired to 1500° C. After the firing, the absorption of the refractory was 8.0%, its specific gravity 2.5 and its cold crushing strength 33,500 psi. An X-Ray diagram and an examination under polarized light shows that this refractory material was essentially composed of olivine and magnesioferrite.

Table III provides a comparison of the various constituents through the various stages of operation.

TABLE III

|  | Initial residue −28 mesh % | demagnetized fraction % | calcined demagnetized fraction (granular) % |
| --- | --- | --- | --- |
| MgO | 41.6 | 34.1 | 38.2 |
| $SiO_2$ | 33.2 | 26.8 | 30.0 |
| $Fe_2O_3$ | 10.4 | 27.6 | 30.9 |
| LOI | 13.8 | 10.8 | — |
| $MgO/SiO_2$ | 1.25 | 1.27 | 1.27 |

EXAMPLE III

To 27.7 lb of the granular material obtained in Example II there was added 6.9 lb (25%) of MgO. The mixture was shaped and pressed in a mold at 5000 psi and fired in a kiln to 1550° C. After firing, the absorption of the refractory was 3.0%, its specific gravity of 2.90 and its cold crushing strength diagram and examination under polarized light showed that 10,360 psi this refractory was essentially composed of forsterite, magnesioferrite and periclase.

I claim:

1. Process for preparing a granular calcined magnetic composition from chrysotile asbestos tailings, which consists essentially of magnetically separating chrysotile asbestos tailings passing a 4 mesh sieve, having an iron oxide content of about 10%, and MgO content of from 35 to 43%, an $SiO_2$ content of from 35 to 43%, recovering the magnetic concentrate fraction wherein the MgO content is from 25 to 43%, the $SiO_2$ content is from 25 to 43% and the $Fe_2O$ is from 13 to 35%, and calcining said magnetic fraction at a temperature from about 1250° C. to about 1400° C. to provide a granular composition having an iron oxide content of from 15 to 40%.

2. Process for preparing a granular calcined magnetic composition from chrysotile asbestos tailings, which consists essentially of magnetically separating a chrysotile asbestos tailings having a particle size of −35 mesh, an MgO content of about 41%, and $SiO_2$ content of about 34% and a total iron oxide content of about 9%, recovering the magnetic fraction containing about 33% MgO, 28% $SiO_2$, and about 24% iron oxide, and calcining said magnetic fraction at a temperature from about 1250° C. to about 1400° C. thereby to obtain a granular material characterized by an MgO content of about 38%, an $SiO_2$ content of about 32% and a total iron oxide content of about 28%.

* * * * *